US012680597B2

(12) United States Patent
Folkesson et al.

(10) Patent No.: US 12,680,597 B2
(45) Date of Patent: Jul. 14, 2026

(54) TRANSMISSION ARRANGEMENT FOR AN ELECTRICALLY PROPELLED VEHICLE

(71) Applicant: Volvo Truck Corporation, Gothenburg (SE)

(72) Inventors: Johan Folkesson, Skene (SE); Sven Norberg, Hisings Backa (SE); Anders Hedman, Marstrand (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/046,937

(22) Filed: Feb. 6, 2025

(65) Prior Publication Data

US 2025/0257791 A1      Aug. 14, 2025

(30) Foreign Application Priority Data

Feb. 14, 2024      (EP) .................................... 24157498

(51) Int. Cl.
F16H 3/66 (2006.01)
(52) U.S. Cl.
CPC ....... F16H 3/66 (2013.01); F16H 2200/0021 (2013.01); F16H 2200/0026 (2013.01);
(Continued)
(58) Field of Classification Search
CPC ..... F16H 2200/2097; F16H 2200/2007; F16H 2200/2005; F16H 3/52–66;
(Continued)

(56) References Cited

U.S. PATENT DOCUMENTS 4,483,215 A * 11/1984 Ishimaru ............... F16H 47/085
                                                          475/284
7,429,229 B2 * 9/2008 Raghavan ............... F16H 3/663
                                                          475/275
(Continued)

FOREIGN PATENT DOCUMENTS

CN          106931103 A      7/2017
CN          115306872 A * 11/2022   ......... F16H 61/0403
(Continued)

OTHER PUBLICATIONS

Extended European Search Report, European Application No. 24157498.
7, mailed Aug. 27, 2024, 15 pages.

*Primary Examiner* — Ernesto A Suarez
*Assistant Examiner* — Lillian T Nguyen
(74) *Attorney, Agent, or Firm* — Sage Patent Group

(57)      ABSTRACT
The present disclosure relates to a transmission arrangement including an input shaft, and an output shaft, a first gear stage including a first gear wheel and a second gear wheel drivingly connected to each other, a first planetary gear set including a first sun gear, a first ring gear and a first planet carrier, wherein the first planet carrier is rotationally connected to the output shaft, and a crawler unit being drivingly connectable between the first planetary gear set and the output shaft by a first clutch, wherein the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier.

17 Claims, 9 Drawing Sheets

(52) U.S. Cl.
CPC ................ *F16H 2200/2007* (2013.01); *F16H 2200/2038* (2013.01)

(58) Field of Classification Search
CPC ........ B60K 2006/4816; B60K 1/00–02; B60K 17/02; B60K 17/08; B60K 17/16–165
See application file for complete search history.

(56) References Cited

U.S. PATENT DOCUMENTS

| | | | | |
|---|---|---|---|---|
| 10,378,616 | B2 * | 8/2019 | Warth ..................... | F16H 3/663 |
| 10,871,212 | B2 | 12/2020 | Dahlback et al. | |
| 11,137,050 | B2 | 10/2021 | Etchason | |
| 11,712,955 | B1 | 8/2023 | Cattoor et al. | |
| 11,718,172 | B1 | 8/2023 | Engerman | |
| 2011/0319211 | A1 * | 12/2011 | Si ............................ | F16H 3/728 |
| | | | | 475/5 |
| 2017/0175855 | A1 * | 6/2017 | Etchason ................ | F16H 3/666 |
| 2020/0096084 | A1 * | 3/2020 | Engerman .............. | F16H 3/006 |
| 2023/0139069 | A1 | 5/2023 | Rittler et al. | |
| 2025/0297672 | A1 * | 9/2025 | Folkesson .............. | B60K 17/08 |

FOREIGN PATENT DOCUMENTS

| | | | |
|---|---|---|---|
| DE | 102021211713 | A1 | 4/2023 |
| EP | 4170202 | A1 | 4/2023 |

* cited by examiner

*Fig. 5*

TRANSMISSION ARRANGEMENT FOR AN ELECTRICALLY PROPELLED VEHICLE

CROSS REFERENCE TO RELATED APPLICATIONS

This application claims priority to European Patent Application No. 24157498.7, filed on Feb. 14, 2024, the disclosure and content of which is incorporated by reference herein in its entirety.

TECHNICAL FIELD

The disclosure relates generally to vehicle transmissions. In particular aspects, the disclosure relates to a transmission arrangement for an electrically propelled vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Propulsion systems for vehicles are continuously developed to meet the demands from the market. A particular aspect relates to the emission of environmentally harmful exhaust gases. Therefore, vehicles propelled by electric traction motors have been increasingly popular, both for cars as well as for heavy duty vehicles.

For cars, a transmission may conventionally comprise a fixed ratio between an input shaft and an output shaft to provide a desired output torque and a desired cruise speed. However, for heavy duty vehicles, the demands for startability and a suitable rotational speed of the electric machine requires a transmission that enables for a plurality of gear states due to e.g., the relatively large weight of this type of vehicle. The omission of a transmission arrangement for a heavy duty vehicle would, for example, require the use of powerful and expensive electric traction motors.

Conventional transmission arrangements for heavy duty vehicle are either bulky or are not providing for the desired functionalities, such as enabling for a sufficiently large speed reduction during crawling. There is thus a desire to provide a compact transmission arrangement that can enable for desired speed ranges as well as providing a sufficiently high torque to the wheels during start-up.

SUMMARY

According to a first aspect of the disclosure, there is provided a transmission arrangement for a vehicle, the transmission arrangement comprising an input shaft drivingly connectable to an electric traction motor, and an output shaft drivingly connectable to a pair of wheels of the vehicle, a first gear stage comprising a first gear wheel and a second gear wheel drivingly connected to each other, the first gear wheel being rotationally connected to the input shaft, a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are rotationally connectable to the second gear wheel of the first gear stage, and wherein the first planet carrier is rotationally connected to the output shaft, and a crawler unit comprising a plurality of gear members, the crawler unit being drivingly connectable between the first planetary gear set and the output shaft by a first clutch, wherein the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier.

The first aspect of the disclosure may seek to at least partly mitigate the problem of transmission arrangements being bulky to enable for the desired functionalities associated with heavy duty vehicle implementations. A technical benefit may thus include that a compact transmission arrangement is provided, which compact transmission arrangement enables for a desirable number of selectable speed ratios as well as being provided with a crawler unit with a large speed reduction between the input shaft and the output shaft. The large speed reduction enables for large weight vehicles to start from standstill in a desirable manner. The inventors of the present disclosure have realized that by providing a crawler unit with a first clutch that causes the first ring gear to rotate in an opposite direction compared to a rotational direction of the first planet carrier when the first clutch is engaged further increases the speed reduction between the input shaft and the output shaft. A technical benefit is thus that the wheels of the vehicle can be provided with a high torque during crawling when the first clutch is engaged.

In the following and throughout the description, the wording "rotationally connected to" and "rotationally connect" should be interpreted such that a component of the transmission arrangement is connected to another component of the transmission arrangement in such a way that the components rotate in the same direction and with the same rotational speed. The components thus rotate in the same direction and with the same rotational speed when being rotationally connected to each other. The wording "connectable" should thus be construed as connectable by a clutch, the components are hence selectively connectable. In the above, when one of the plurality of gear members of the crawler unit is rotationally connected to the stationary member, the gear member of the crawler unit is also stationary which should be construed as falling within the scope of the definition "rotationally connected to".

Further, the wording "drivingly connected to" and "drivingly connectable to" should be interpreted as two components being either directly connected to each other, i.e. the components rotate in the same direction and with the same rotational speed, or connected to each other with one or more gear wheels therebetween. In the latter example, when a first component rotates, then a second component also rotates with a ratio to the first component. The first and second components may not necessarily rotate in the same direction and with the same rotational speed.

In some embodiments, the first gear stage is a reduction gear stage in which, during operation of the transmission arrangement, the first gear wheel rotates at a higher rotational speed compared to a rotational speed of the second gear wheel. A technical benefit may include that the electric machine can be allowed to rotate faster. The size of an electric machine is dependent on the maximum torque it is able to produce. High rotational speed can thus compensate for lower torque levels and the electric machine can hereby be made smaller which in turn reduces the cost for such electric machine.

The first and second gear wheels may be arranged in meshing engagement with each other. Alternatively, one or more additional gear wheels may be provided between the first and second gear wheels.

In some embodiments, the first sun gear of the first planetary gear set is rotationally connectable to the second gear wheel of the first gear stage by a second clutch of the transmission arrangement. A technical benefit may include that the first sun gear is rotationally connected to the second gear wheel for some gear states but not for others.

In a similar vein as described above in relation to the interpretation of the definition "rotationally connected to", the wording "rotationally connectable to" should be construed such that the components of the transmission arrangement rotate in the same direction and with the same rotational speed when being connected to each other by a clutch, which clutch in the specific example is the second clutch.

In some embodiments, the first ring gear of the first planetary gear set is rotationally connectable to the second gear wheel of the first gear stage by a third clutch of the transmission arrangement. A technical benefit may include that the first ring gear is rotationally connected to the second gear wheel for some gear states but not for others.

In some embodiments, the first ring gear of first planetary gear set is rotationally connectable to the stationary member via the third clutch.

The third clutch should also be construed as being able to assume a neutral position in which the third clutch is not connected to any one of the second gear wheel of the first gear stage or the stationary member. In such case, the ring gear rotates without direct interaction with the second gear wheel or the stationary member.

With the implementation of the second clutch and the third clutch, three gear ratios are obtainable for the transmission arrangement. By means of the first clutch of the crawler unit, a fourth gear ratio is provided.

In some embodiments, the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

In some embodiments, the second sun gear is rotationally connected to the first planet carrier.

In some embodiments, the second ring gear is rotationally connectable to the first ring gear via the first clutch of the crawler unit. A technical benefit may include that the opposite rotational direction of the ring gear provides a sufficiently large ratio between the second gear wheel and the first planet carrier. Further, the crawler gear state may hereby be engaged at a large diameter which will generate low load on gear teeth.

In some embodiments, the second planet carrier is rotationally connected to the stationary member of the transmission arrangement. A technical benefit may include that the planet carrier and its planet wheels are not exposed to centrifugal loads.

In some embodiments, the second ring gear is rotationally connected to the first ring gear.

In some embodiments, the second planet carrier is rotationally connectable to the stationary member via the first clutch of the crawler unit.

In some embodiments, the second ring gear is rotationally connected to the first ring gear.

In some embodiments, the second planet carrier is rotationally connected to the stationary member.

In some embodiments, the second sun gear is rotationally connectable to the first planet carrier via the first clutch of the crawler unit.

A technical benefit may include that the crawler gear state can be engaged via the second sun gear. The second sun gear can hereby be provided with a small diameter since it will not be exposed to high torque loads.

In some embodiments, the second ring gear is rotationally connected to the first planet carrier.

In some embodiments, the second planet carrier is rotationally connected to the stationary member.

In some embodiments, the second sun gear is rotationally connectable to the first ring gear via the first clutch of the crawler unit.

A technical benefit may include that a large rotation in the opposite direction is provided for the first ring gear, which in turn generates a large ratio between the second gear wheel and the output shaft. In addition, the second sun gear can be provided with a small diameter since it will not be exposed to high torque loads.

In some embodiments, the second sun gear is rotationally connected to the first ring gear.

In some embodiments, the second ring gear is rotationally connected to the first planet carrier.

In some embodiments, the second planet carrier is rotationally connectable to the stationary member via the first clutch of the crawler unit.

A technical benefit may include that a large rotation in the opposite direction is provided for the first ring gear, which in turn generates a large ratio between the second gear wheel and the output shaft. In addition, the second sun gear can be provided with a small diameter since it will not be exposed to high torque loads.

In some embodiments, the second sun gear is rotationally connected to the first ring gear.

In some embodiments, the second planet carrier is rotationally connected to the stationary member.

In some embodiments, the second ring gear is rotationally connectable to the first planet carrier via the first clutch of the crawler unit.

A technical benefit may include that the crawler gear state can be engaged at a large diameter which will provide low loads on the gear teeth. Also, since the second planet carrier is rotationally connected to the stationary member, the second planet carrier and its planet wheels will not be exposed to centrifugal forces.

In some embodiments, the crawler unit comprises a crawler gear stage, the crawler gear stage comprising a set of crawler gear wheels drivingly connectable between the first planet carrier and the first ring gear via the first clutch of the crawler unit. The first clutch of the crawler unit may be positioned to rotationally connect a first gear wheel of the set of gear wheels to the first planet carrier. Optionally, the first clutch of the crawler unit may be positioned to rotationally connect a second gear wheel and a third gear wheel of the set of gear wheels to each other, wherein the second gear wheel is arranged in meshing engagement with the first gear wheel, and the third gear wheel is rotationally connected to the first ring gear. As another option, the first clutch of the crawler unit may be positioned to rotationally connect the third gear wheel of the set of gear wheels to the first ring gear.

A technical benefit may include that there is an increased freedom to choose ratio between the first ring gear and the output shaft, thereby simplifying the adaption to specific purposes for the transmission arrangement.

Furthermore, the above described first clutch may advantageously be a first dog clutch. A technical benefit may include that a dog clutch has low power losses when being disengaged. The second and third clutches may also be a respective second and third dog clutch.

According to a second aspect, there is provided a powertrain for an electrically propelled vehicle, the powertrain comprising: an electric traction motor, and a transmission arrangement according to any one of the examples described above in relation to the first aspect, wherein the input shaft of the transmission arrangement is drivingly connected to the electric traction motor.

Effects and features of the second aspect are largely analogous to those described above in relation to the first aspect.

According to a third aspect, there is provided a vehicle comprising the transmission arrangement according to any one of the examples described above in relation to the first aspect, or the powertrain according to the above described second aspect.

Effects and features of the third aspect are largely analogous to those described above in relation to the first aspect.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

FIGS. 2-8 are schematic illustrations of exemplary transmission arrangements.

DETAILED DESCRIPTION

The detailed description set forth below provides information and examples of the disclosed technology with sufficient detail to enable those skilled in the art to practice the disclosure.

The following disclosure aims at providing a compact and efficient transmission arrangement that can enable for a desirable number of speed ratios as well as to provide a crawler unit with a large speed reduction between the input shaft and the output shaft.

Figure 1:
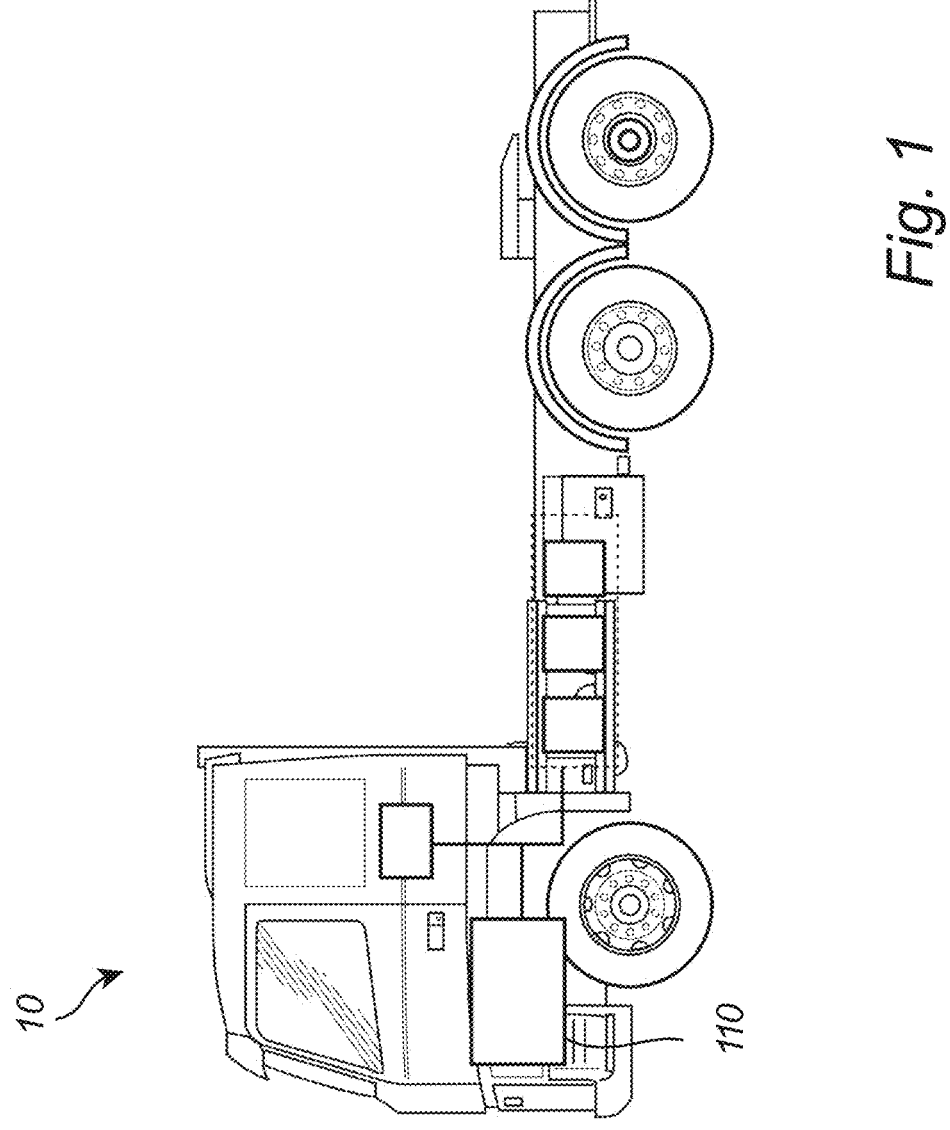
FIG. 1 is an exemplary vehicle according to an example.

With initial reference to FIG. 1, in which an exemplary vehicle 10 is depicted. The exemplified vehicle 10 is configured to be at least partly propelled by an electric traction motor 110. As will be evident from the below description, and as can be seen in FIGS. 2-9, the electric traction motor 110 is drivingly connected to a transmission arrangement 120, 220, 320, 420, 520, 620, 720.

Figure 2:
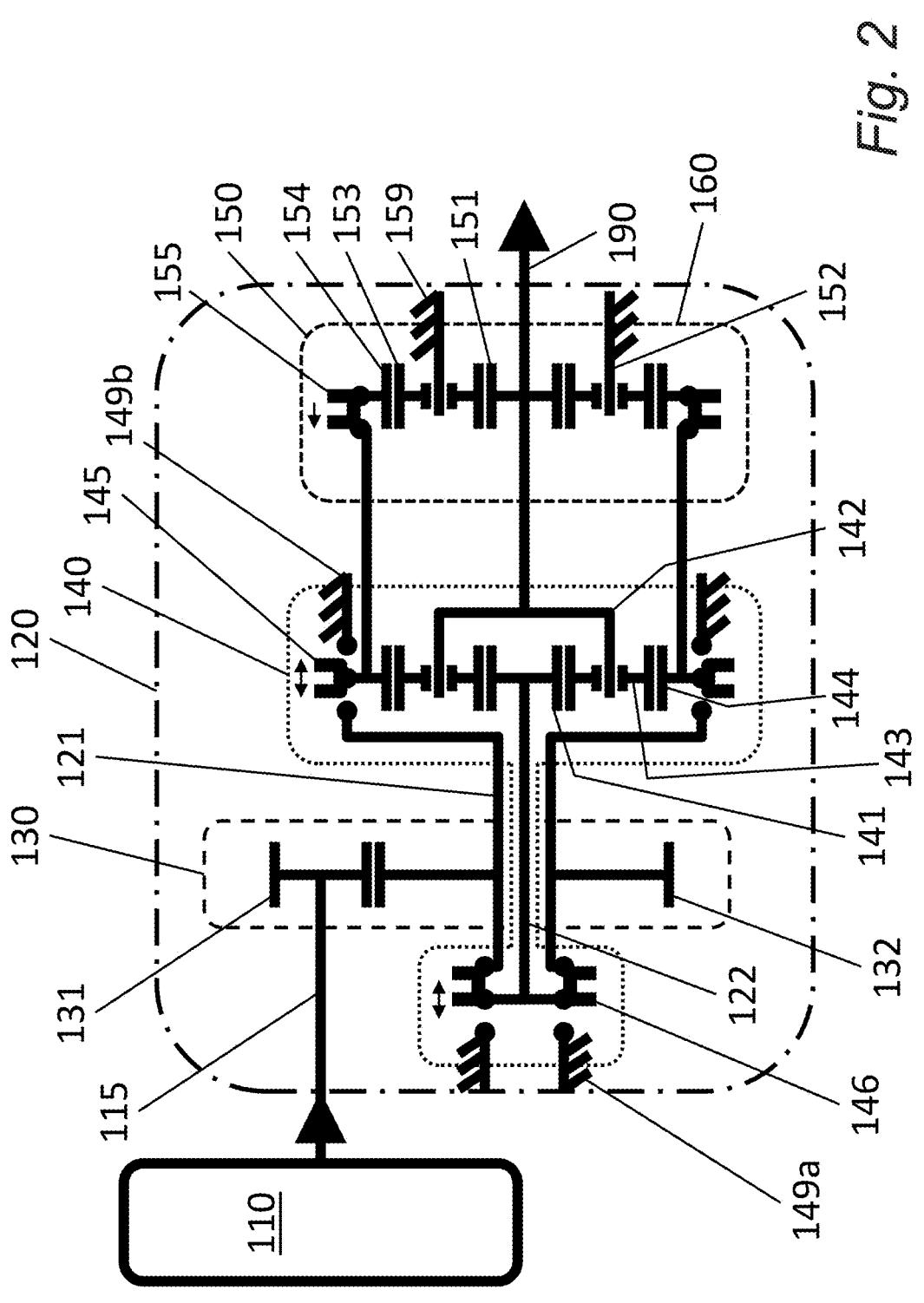

In order to describe the transmission arrangement, reference is now made to FIG. 2 in which a first example of the transmission arrangement 120 is depicted. The transmission arrangement 120 comprises an input shaft 115. The input shaft 115 is drivingly connected to the electric traction motor 110. In the example depicted in FIG. 2, as well as in FIGS. 3-9, the input shaft 115 is directly connected to the electric traction motor 110. It should however be readily understood that a transmission component, such as e.g., a clutch and/or a gear stage may be present between the input shaft 115 and the electric traction motor 110.

Further, the transmission arrangement 120 comprises a first gear stage 130. The first gear stage 130 comprises a first gear wheel 131 and a second gear wheel 132 drivingly connected to each other. In some embodiments, the first gear stage 130 is a reduction gear stage in which, during operation of the transmission arrangement, the first gear wheel 131 rotates at a higher rotational speed compared to a rotational speed of the second gear wheel 132. The first 131 and second 132 gear wheels are in the example illustrated in FIG. 2 arranged in meshing engagement with each other. In such implementation, the first gear wheel 131 comprises a lower number of gear teeth compared to a number of gear teeth of the second gear wheel 132. It should however be readily understood that one or more gear wheels may be positioned between the first 131 and second 132 gear wheels. The first gear wheel 131 is rotationally connected to the input shaft 115, while the second gear wheel is rotationally connected to a transmission shaft 121, also referred to as an inter-gearset shaft. In some embodiments, the transmission shaft 121 is hollow to accommodate an additional shaft 122.

The transmission arrangement 120 further comprises a first planetary gear set 140, which first planetary gear set 140 comprises a first sun gear 141, a first ring gear 144, and a first planet carrier 142 carrying a first set of planet gears 143. The first set of planet gears 143 are in meshing engagement with the first ring gear 144 and the first sun gear 141.

Moreover, the transmission arrangement 120 also comprises a crawler unit 150. The crawler unit 150 comprises a plurality of gear members 151, 153, 154. In the example depicted in FIG. 2, the plurality of gear members are arranged as gear members of a second planetary gear set 160. The second planetary gear set 160 comprises a second sun gear 151, a second ring gear 154 and a second planet carrier 152 carrying a second set of planet gears 153, wherein the second set of planet gears 153 is in meshing engagement with the second ring gear 154 and the second sun gear 151.

Figure 9:
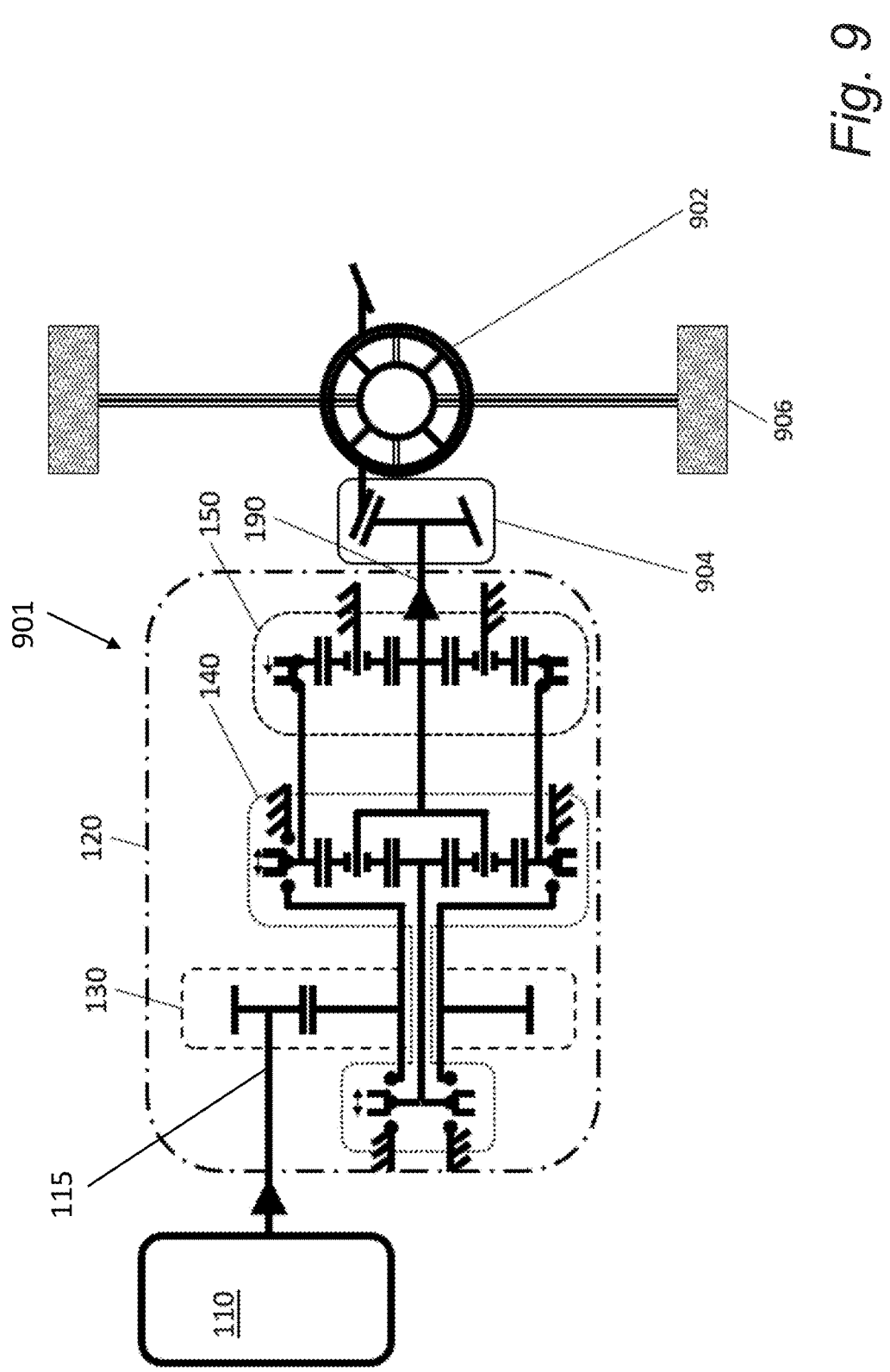
FIG. 9 is a schematic illustration of an exemplary powertrain comprising a transmission arrangement.

Further, the second sun gear 151 is rotationally connected to the first planet carrier 142. The second sun gear 151 is also rotationally connected to an output shaft 190 of the transmission arrangement 120, which output shaft 190 is drivingly connectable to a pair of wheels of the vehicle, as can be seen in FIG. 9. Since the second sun gear 151 is rotationally connected to the first planet carrier 142 as well as to the output shaft 190, the first planet carrier 142 is also rotationally connected to the output shaft 190. Moreover, the second planet carrier 152 is rotationally connected to a stationary member 159 of the transmission arrangement 120. The stationary member 159 may be a transmission housing (not shown) accommodating the transmission arrangement 120. By rotationally connecting the planet carrier 152 to the stationary member 159, the planet carrier 152 is maintained stationary for each of the gear states described below. Finally, the second ring gear 154 is rotationally connectable to the first ring gear 144 by a first clutch 155 of the crawler unit 150. The first clutch 155 is thus configured to assume a crawler engagement mode in which the crawler unit 150 is drivingly connected to the first planetary gear set 140 by rotationally connecting the second ring gear 154 to the first ring gear 144. The first clutch 155 is also configured to a crawler disengagement mode in which the crawler unit 150 is disconnected from the first planetary gear set 140 by arranging the first clutch 155 in a neutral position.

Turning again to the first planetary gear set 140. The first sun gear 141 of the first planetary gear set 140 is rotationally connected to the above described additional shaft 122. The additional shaft 122 is rotationally connectable to the second gear wheel 132 of the first gear stage 130 by a second clutch 146. As such, the first sun gear 141 is rotationally connectable to the second gear wheel 132 via the second clutch 146. The second clutch 146 is further configured to rotationally connect the first sun gear 141 to the stationary member 149*a*. Moreover, the first ring gear 144 of the first planetary gear set 140 is rotationally connectable to the transmission shaft 121 by a third clutch 145. As such, the third clutch 145 is configured to rotationally connect the first ring gear 144 to the second gear wheel 132 of the first gear stage 130. The third clutch 145 is further configured to rotationally connect the first ring gear 144 to the stationary member 149*b*. In addition, the third clutch 145 is also configured to assume a neutral position in which the first ring gear 144 is not rotationally connected to any one of the second gear wheel 132 and the stationary member 149, i.e. the first ring gear 144 rotates freely.

The above describe stationary member 149*a* to which the second clutch 146 is connectable, the stationary member 149*b* to which the third clutch 145 is connectable and the stationary member rotationally connected to the second planet carrier 152 may be one and the same stationary member, such as e.g., the above indicated transmission housing. The stationary members may however be formed by different transmission components as long as being stationary relative to the rotational components to which they are connected or connectable.

The transmission arrangement 120 described above in relation to the example depicted in FIG. 2 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149*b*. Hereby, the first ring gear 144 is stationary and the first sun gear 141 is driven, whereby a first speed reduction is obtained between the input shaft and the output shaft. The second gear wheel 132, the first sun gear 141, the first planet carrier 142, and the output shaft 190 all rotate in the same direction.

A second gear state is assumed by positioning the first clutch 155 in neutral position, positioning the second clutch 146 to rotationally connect the first sun gear 141 to the stationary member 149*a*, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction. The second gear wheel 132, the first ring gear 144, the first planet carrier 142, and the output shaft 190 all rotate in the same direction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first sun gear 141, the first ring gear 144, the first planet carrier 142, and the output shaft 190 all rotate with the same rotational speed in the same direction.

The crawler gear is assumed by positioning the first clutch 155 to rotationally connect the second ring gear 154 to the first ring gear 144, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction. The second gear wheel 132, the first sun gear 141, the first planet carrier 142, the second sun gear 151 and the output shaft 190 all rotate in the same direction, while the first 144 and second 154 ring gears rotate in the opposite direction.

Figure 3:
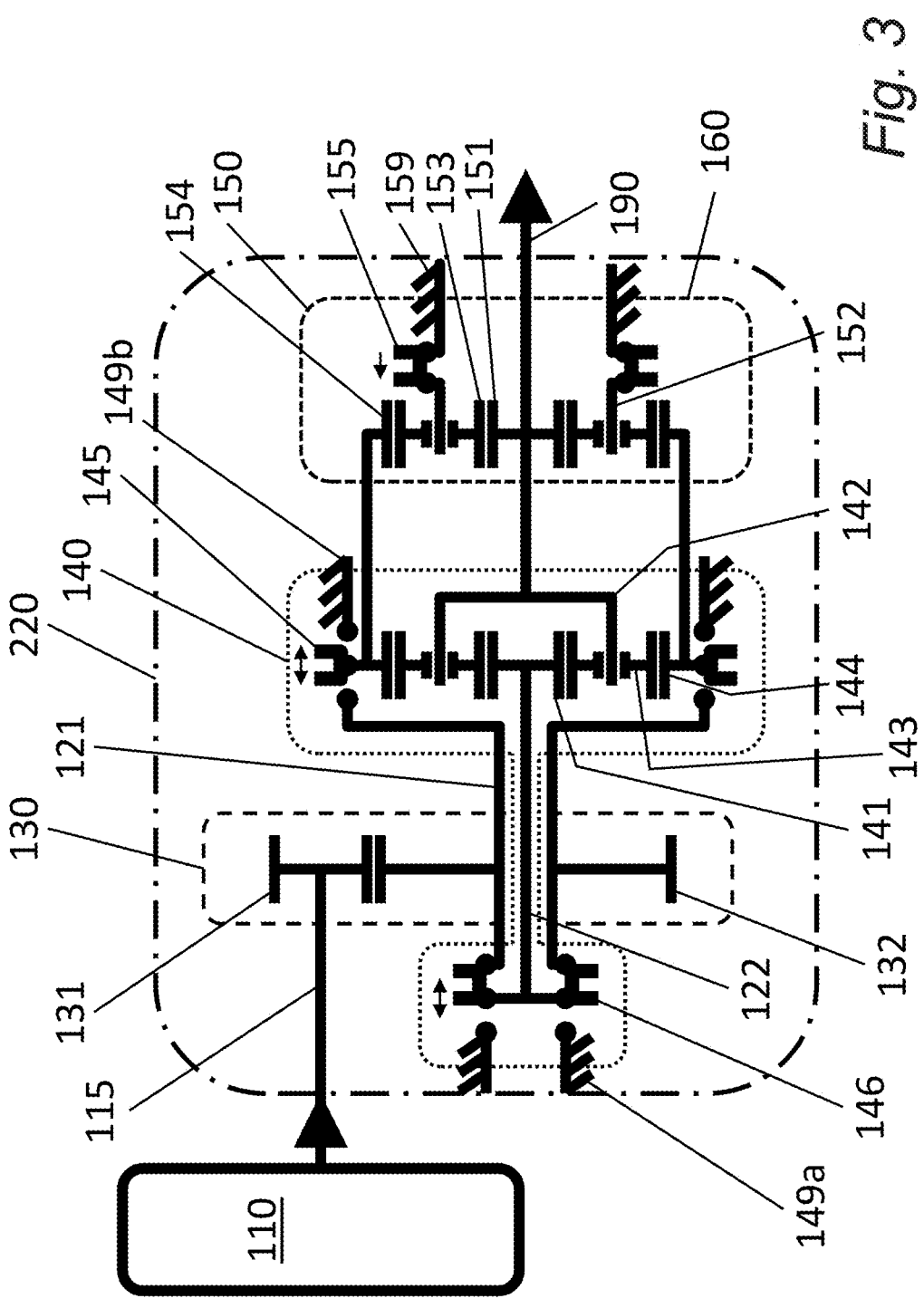

In order to describe the transmission arrangement 220 according to another example, reference is made to FIG. 3. The difference between the example depicted in FIG. 2 and the example depicted in FIG. 3 is the crawler unit and how it is connected to the first planetary gear set 140 and stationary member. The following will only describe the differences between the examples in FIGS. 2 and 3.

In the example illustrated in FIG. 3, the second ring gear 154 is rotationally connected to the first ring gear 144. The second planet carrier 152 is rotationally connectable to the stationary member 159 via the first clutch 155 of the crawler unit 150.

The transmission arrangement 220 in the example depicted in FIG. 3 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149*b*. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149*a*, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first sun gear 141, the first ring gear 144, the first planet carrier 142, and the output shaft 190 all rotate with the same rotational speed in the same direction. In the direct gear of the example illustrated in FIG. 3, there is no relative rotation between the second sun gear 151, the second planet carrier 152, the second set of planet gears 153 and the second ring gear 154, which may reduce power losses.

The crawler gear is assumed by positioning the first clutch 155 to rotationally connect the second planet carrier gear 152 to the stationary member 159, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Figure 4:
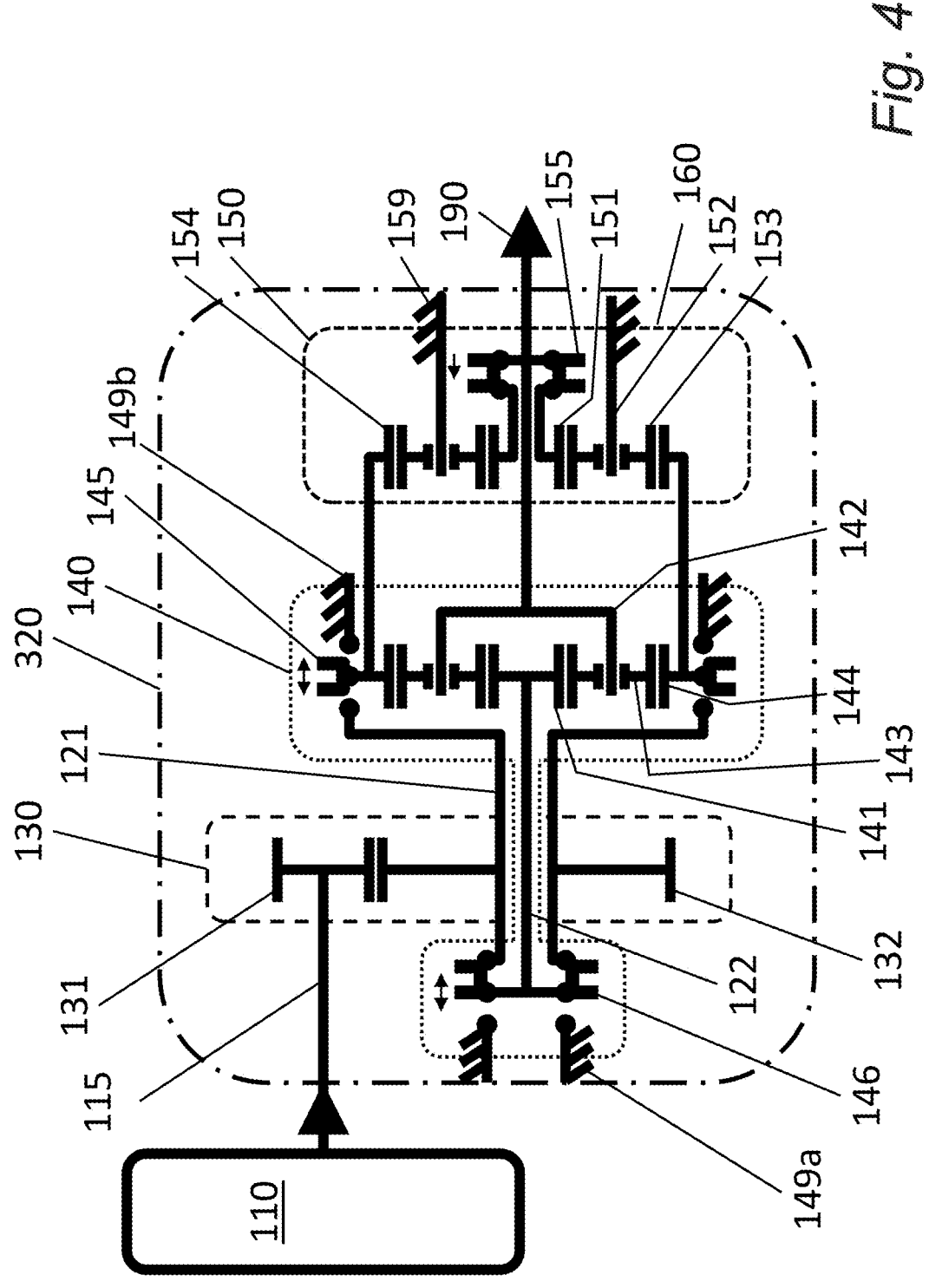

In order to describe the transmission arrangement 320 according to another example, reference is made to FIG. 4. The difference between the examples depicted in FIGS. 2-3 and the example depicted in FIG. 4 is the crawler unit and how it is connected to the first planetary gear set 140 and the stationary member. The following will mainly describe the differences between the examples in FIGS. 2-3 and the example in FIG. 4.

In the example illustrated in FIG. 4, the second ring gear 154 is rotationally connected to the first ring gear 144. The second planet carrier 152 is rotationally connected to the stationary member 159, while the second sun gear 151 is rotationally connectable to the first planet carrier 142 via the first clutch 155 of the crawler unit 150.

The transmission arrangement 320 in the example depicted in FIG. 4 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149b. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149a, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first ring gear 144, the first planet carrier 142, and the output shaft 190 all rotate in the same direction.

The crawler gear is assumed by positioning the first clutch 155 to rotationally connect the second sun gear 151 to the first planet carrier 142, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Figure 5:
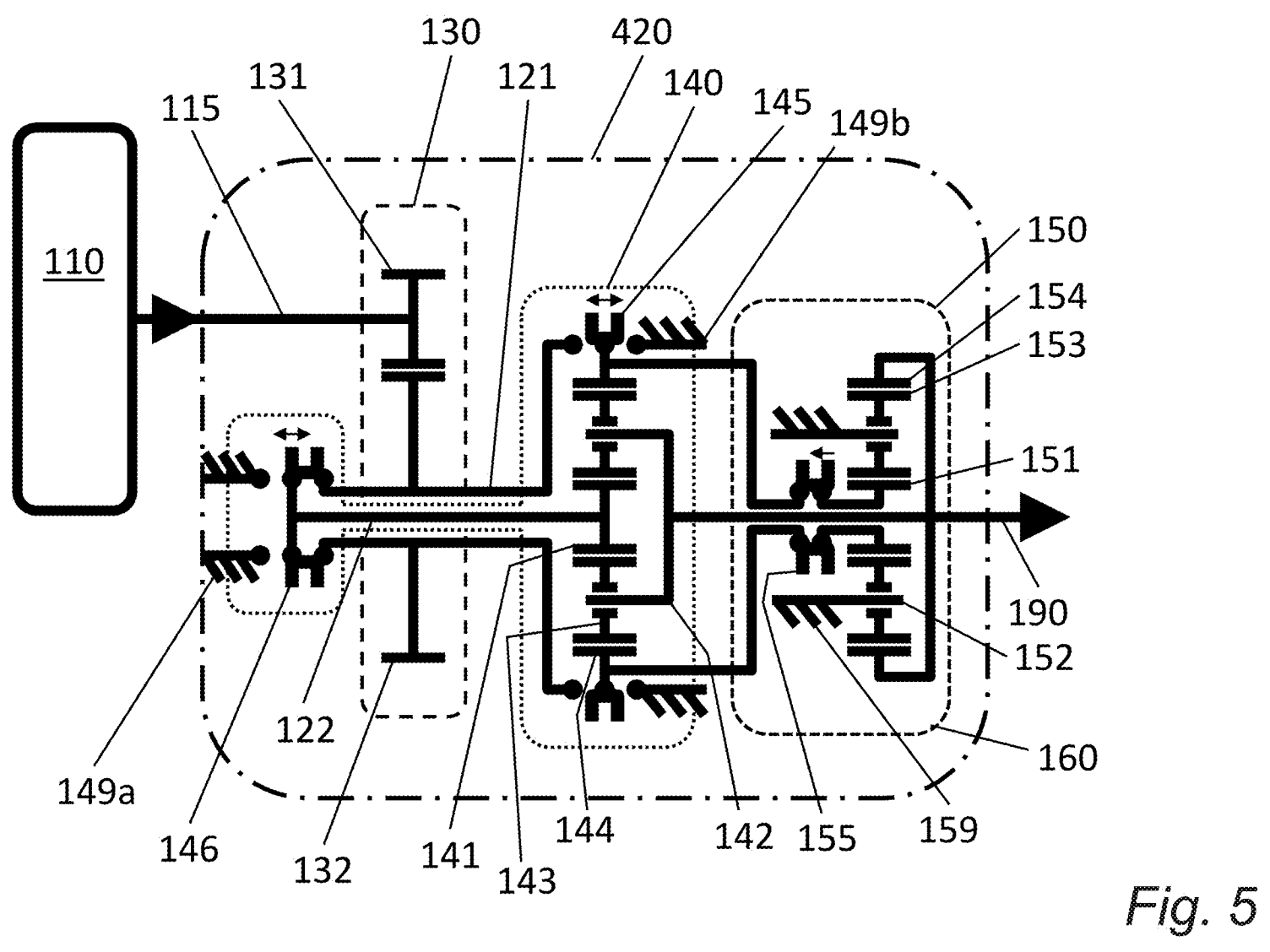

In order to describe the transmission arrangement 420 according to another example, reference is made to FIG. 5. The difference between the example depicted in FIGS. 2-4 and the example depicted in FIG. 5 is the crawler unit and how it is connected to the first planetary gear set 140 and the stationary member. The following will mainly describe the differences between the examples in FIGS. 2-4 and the example in FIG. 5.

In the example illustrated in FIG. 5, the second sun gear 151 is rotationally connectable to the first ring gear 144 via the first clutch 155. The second planet carrier 152 is rotationally connected to the stationary member 159. The second ring gear 154 is rotationally connected to the first planet carrier 142. Since, as described above in relation to the description of FIG. 2, the first planet carrier 142 is rotationally connected to the output shaft 190, the second ring gear 154 is also rotationally connected to the output shaft 190.

The transmission arrangement 420 in the example depicted in FIG. 5 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149b. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149a, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first ring gear 144, the first planet carrier 142, and the output shaft 190 all rotate in the same direction.

The crawler gear is assumed by positioning the first clutch 155 to rotationally connect the second sun gear 151 to the first ring gear 144, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Figure 6:
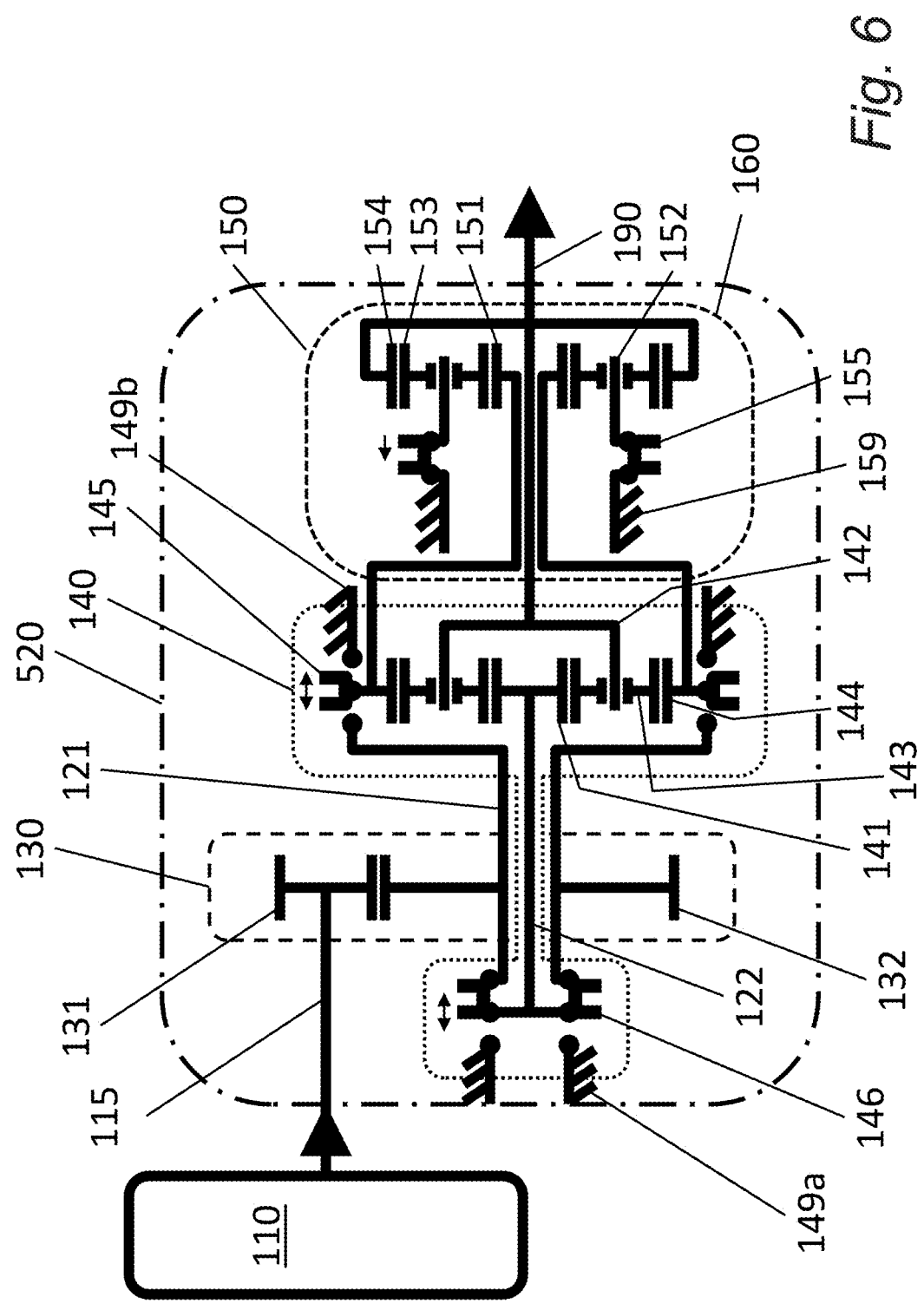

In order to describe the transmission arrangement 520 according to another example, reference is made to FIG. 6. The difference between the examples depicted in FIGS. 2-5 and the example depicted in FIG. 6 is the crawler unit and how it is connected to the first planetary gear set 140 and the stationary member. The following will mainly describe the differences between the examples in FIGS. 2-5 and the example in FIG. 6.

In the example illustrated in FIG. 6, the second sun gear 151 is rotationally connected to the first ring gear 144. The second planet carrier 152 is rotationally connectable to the stationary member 159 via the first clutch 155 of the crawler unit 150. The second ring gear 154 is rotationally connected to the first planet carrier 142. Since, as described above in relation to the description of FIG. 2, the first planet carrier 142 is rotationally connected to the output shaft 190, the second ring gear 154 is also rotationally connected to the output shaft 190.

The transmission arrangement 520 in the example depicted in FIG. 6 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149*b*. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149*a*, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first ring gear 144, the first planet carrier 142, and the output shaft 190 all rotate in the same direction.

The crawler gear is assumed by positioning the first clutch 155 to rotationally connect the second planet carrier 152 to the stationary member 159, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Figure 7:
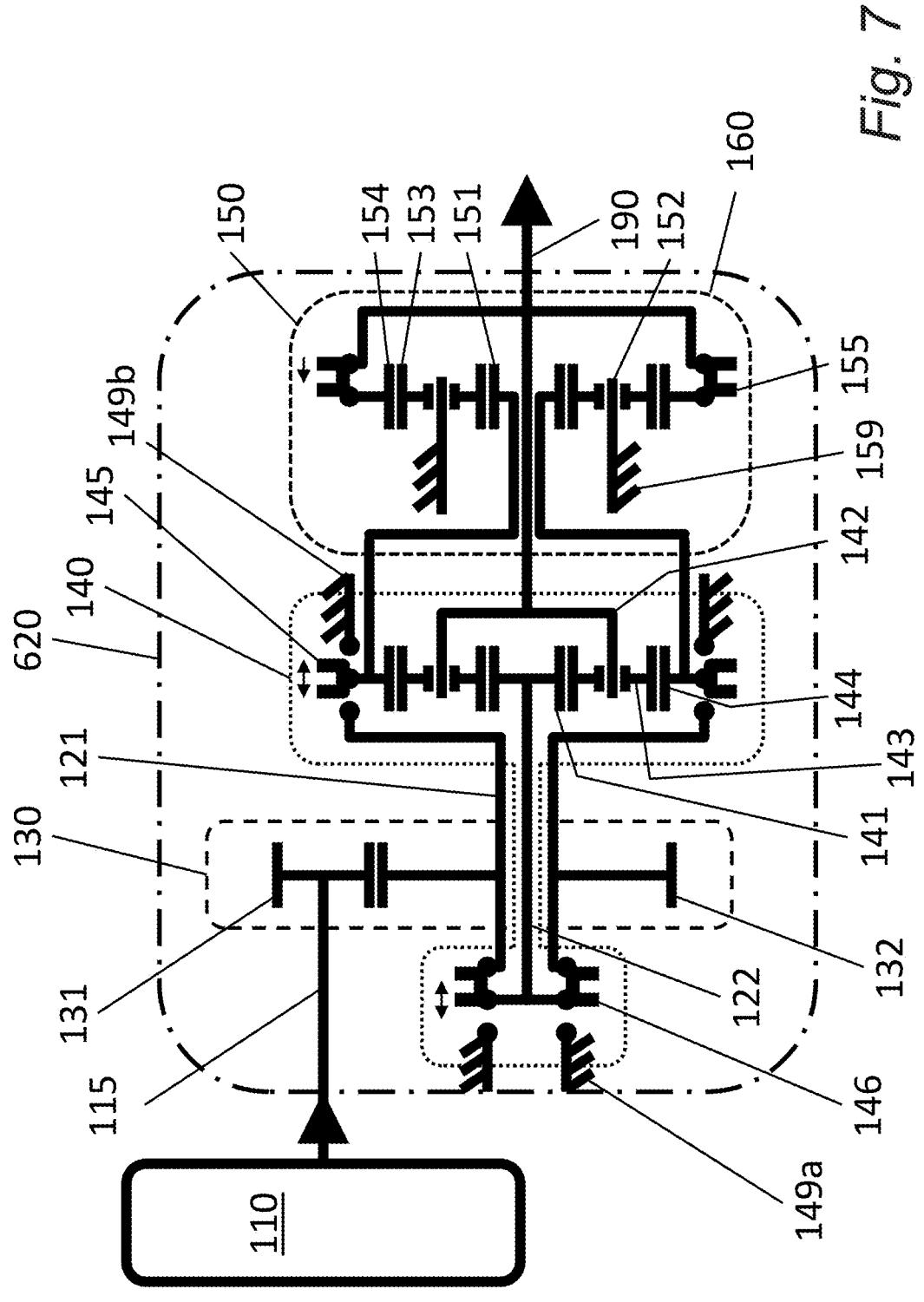

In order to describe the transmission arrangement 620 according to another example, reference is made to FIG. 7. The difference between the examples depicted in FIGS. 2-6 and the example depicted in FIG. 7 is the crawler unit and how it is connected to the first planetary gear set 140 and the stationary member. The following will mainly describe the differences between the examples in FIGS. 2-6 and the example in FIG. 7.

In the example illustrated in FIG. 7, the second sun gear 151 is rotationally connected to the first ring gear 144. The second planet carrier 152 is rotationally connected to the stationary member 159. The second ring gear 154 is rotationally connectable to the first planet carrier 142 via the first clutch 155 of the crawler unit 150. Since, as described above in relation to the description of FIG. 2, the first planet carrier 142 is rotationally connected to the output shaft 190, the second ring gear 154 is also rotationally connectable to the output shaft 190 via the first clutch 155.

The transmission arrangement 620 in the example depicted in FIG. 7 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149*b*. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149*a*, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first ring gear 144, the first planet carrier 142, and the output shaft 190 all rotate in the same direction.

The crawler gear is assumed by positioning the first clutch 155 to rotationally connect the second ring gear 154 to the first planet carrier 142, positioning the second clutch 146 to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Figure 8:
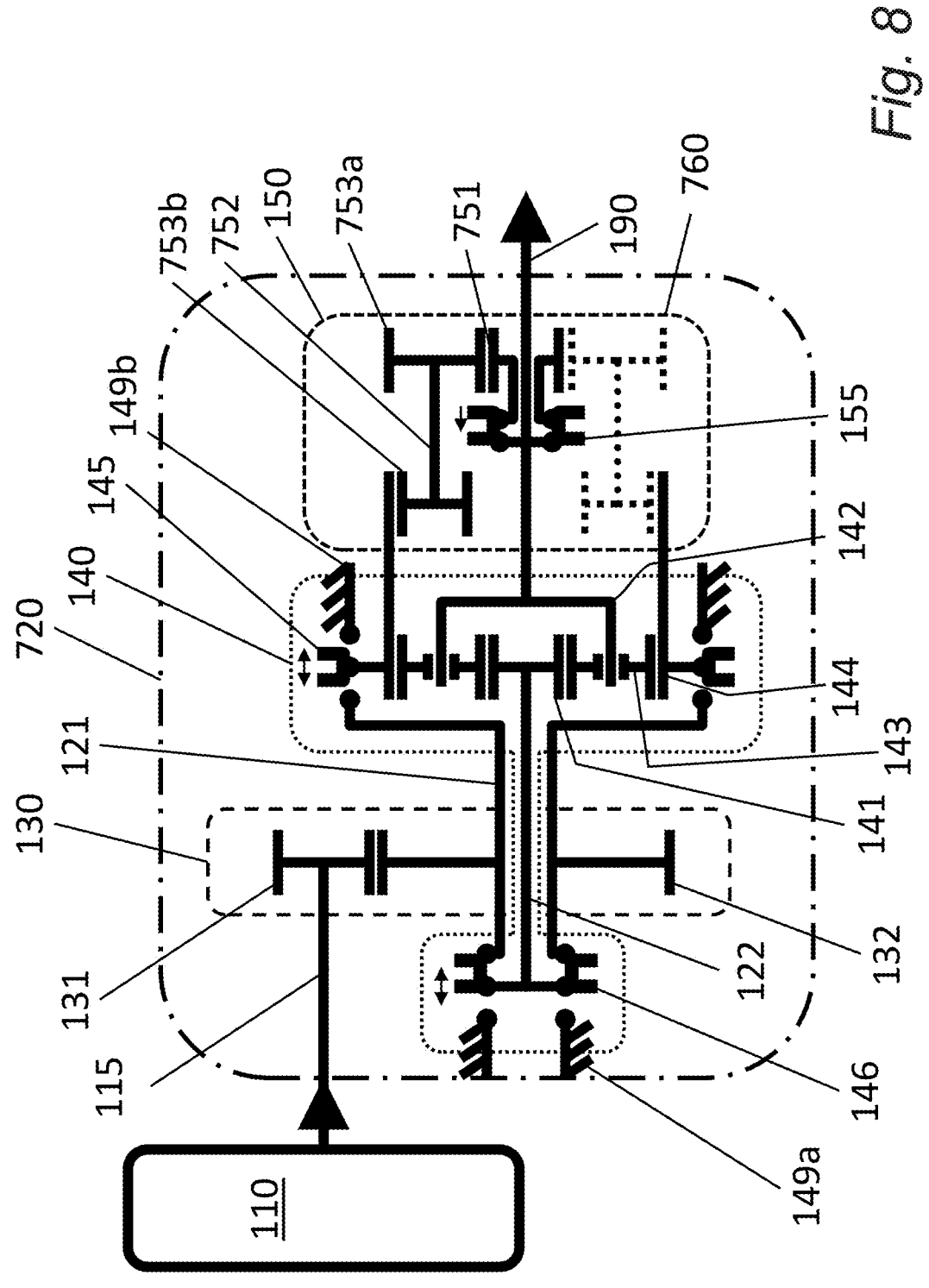

In order to describe the transmission arrangement 720 according to another example, reference is made to FIG. 8. Contrary to the examples described in relation to FIGS. 2-7, the crawler unit comprises a crawler gear stage 760 instead of the above second planetary gear stage 160. The crawler gear stage 760 comprises a set of crawler gear wheels 751, 753*a*, 753*b* which are drivingly connectable between the first planet carrier 142 and the first ring gear 144 via the first clutch 155 of the crawler unit 150. In particular, the crawler unit 150 comprises a first crawler gear wheel 751 rotationally connectable to the first planet carrier 142 via the first clutch 155 of the crawler unit 150, a second crawler gear wheel 753a arranged in meshing engagement with the first crawler gear wheel 751. The crawler unit 150 further comprises a third crawler gear wheel 753b rotationally connected to the second crawler gear wheel 753a via a crawler countershaft 752. The third crawler gear wheel 753b is in turn in meshing engagement with the first ring gear 144 of the first planetary gear set 140. As an alternative, the crawler unit 150 may comprise a plurality of parallel crawler countershafts to drivingly connect the first crawler gear wheel 751 to the first ring gear 144. Also, the first clutch 155 may be arranged at a different position compared to the illustration in FIG. 8, such as between the second 753a and third 753b crawler gear wheels.

The transmission arrangement 720 in the example depicted in FIG. 8 is configured to assume three gear states, i.e. three different speed ratios, as well as to assume a crawler gear. A first gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the stationary member 149b. Hereby, the first ring gear 144 is stationary and the first sun gear 141 is driven, whereby a first speed reduction is obtained between the input shaft and the output shaft.

A second gear state is assumed by positioning the first clutch 155 in neutral position, positioning the second clutch 146 to rotationally connect the first sun gear 141 to the stationary member 149a, and positioning the third clutch 145 to rotationally connect the first ring gear 144 to the second gear wheel 132. Hereby, the first sun gear 141 is stationary and the first ring gear 144 is driven, whereby a second speed reduction is obtained between the input shaft and the output shaft. The second speed reduction is lower/smaller compared to the first speed reduction.

A third gear state is assumed by positioning the first clutch 155 in neutral position, positioning the second clutch 146 to rotationally connect the first sun gear 141 to the second gear wheel 132, and positioning the third clutch 145 to rotationally connect the first ring gear 144 to the second gear wheel 132. Hereby, a direct gear is obtained where the second gear wheel 132, the first ring gear 144, the first planet carrier 142, and the output shaft 190 all rotate in the same direction.

The crawler gear is assumed by positioning the first clutch 155 to rotationally connect the first crawler gear wheel 751 to the first planet carrier 142. Since the first planet carrier 142 is rotationally connected to the output shaft 190, the first crawler gear wheel 751 is thus also rotationally connected to the output shaft 190. The second clutch 146 is positioned to rotationally connect the first sun gear 141 to the second gear wheel 132, and positioning the third clutch 145 to assume the neutral position. Hereby, a third speed reduction is obtained between the input shaft and the output shaft in which the first ring gear 144 and the first planet carrier 142 rotates in opposite directions. The third speed reduction is higher/larger than the first speed reduction. In other words, the output shaft rotates at a lower rotational speed relative to the input shaft for the third speed reduction compared to the relative rotation speed of the input and output shafts for the first speed reduction.

Reference is finally made to FIG. 9 which is a schematic illustration of an exemplary powertrain comprising a transmission arrangement. In FIG. 9, the powertrain 901 comprises the transmission arrangement 120 described above in relation to FIG. 2. It should however be readily understood that each of the exemplified transmission arrangements described in relation to FIGS. 3-8 are equally implementable for the powertrain 901.

The powertrain 901 comprises the electric traction motor 110 drivingly connected to the input shaft 115. In addition, the powertrain 901 comprises a final drive 904, such as e.g., a bevel gear, drivingly connected to the output shaft 190. The final drive 904 is drivingly connected to a differential 902 which in turn is connected to the wheels 906 of the vehicle. It should however be readily understood that the output shaft 190 may equally as well be directly connected to the differential 902 without the use of a final drive 904.

EXAMPLE LIST

Example 1

A transmission arrangement for a vehicle, the transmission arrangement comprising an input shaft drivingly connectable to an electric traction motor, and an output shaft drivingly connectable to a pair of wheels of the vehicle, a first gear stage comprising a first gear wheel and a second gear wheel drivingly connected to each other, the first gear wheel being rotationally connected to the input shaft, a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are rotationally connectable to the second gear wheel of the first gear stage, and wherein the first planet carrier is rotationally connected to the output shaft, and a crawler unit comprising a plurality of gear members, the crawler unit being drivingly connectable between the first planetary gear set and the output shaft by a first clutch, wherein the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier.

Example 2

The transmission arrangement of example 1, wherein the first gear stage is a reduction gear stage in which, during operation of the transmission arrangement, the first gear wheel rotates at a higher rotational speed compared to a rotational speed of the second gear wheel.

Example 3

The transmission arrangement of any one of examples 1 or 2, wherein the first sun gear of the first planetary gear set is rotationally connectable to the second gear wheel of the first gear stage by a second clutch of the transmission arrangement.

Example 4

The transmission arrangement of any one of the preceding examples, wherein the first ring gear of the first planetary gear set is rotationally connectable to the second gear wheel of the first gear stage by a third clutch of the transmission arrangement.

Example 5

The transmission arrangement of example 4, wherein the first ring gear of first planetary gear set is rotationally connectable to the stationary member via the third clutch.

Example 6

The transmission arrangement of any one of the preceding examples, wherein the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

Example 7

The transmission arrangement of example 6, wherein the second sun gear is rotationally connected to the first planet carrier.

Example 8

The transmission arrangement of example 7, wherein the second ring gear is rotationally connectable to the first ring gear via the first clutch of the crawler unit.

Example 9

The transmission arrangement of any one of examples 7 or 8, wherein the second planet carrier is rotationally connected to the stationary member of the transmission arrangement.

Example 10

The transmission arrangement of example 7, wherein the second ring gear is rotationally connected to the first ring gear.

Example 11

The transmission arrangement of examples 7 or 10, wherein the second planet carrier is rotationally connectable to the stationary member via the first clutch of the crawler unit.

Example 12

The transmission arrangement of example 6, wherein the second ring gear is rotationally connected to the first ring gear.

Example 13

The transmission arrangement of examples 6 or 12, wherein the second planet carrier is rotationally connected to the stationary member.

Example 14

The transmission arrangement of any one of example 6 or 12-13, wherein the second sun gear is rotationally connectable to the first planet carrier via the first clutch of the crawler unit.

Example 15

The transmission arrangement of example 6, wherein the second ring gear is rotationally connected to the first planet carrier.

Example 16

The transmission arrangement of examples 6 or 15, wherein the second planet carrier is rotationally connected to the stationary member.

Example 17

The transmission arrangement of any one of example 6 or 15-16, wherein the second sun gear is rotationally connectable to the first ring gear via the first clutch of the crawler unit.

Example 18

The transmission arrangement of example 6, wherein the second sun gear is rotationally connected to the first ring gear.

Example 19

The transmission arrangement of examples 6 or 18, wherein the second ring gear is rotationally connected to the first planet carrier.

Example 20

The transmission arrangement of any one of examples 6 or 18-19, wherein the second planet carrier is rotationally connectable to the stationary member via the first clutch of the crawler unit.

Example 21

The transmission arrangement of example 6, wherein the second sun gear is rotationally connected to the first ring gear.

Example 22

The transmission arrangement of examples 6 or 21, wherein the second planet carrier is rotationally connected to the stationary member.

Example 23

The transmission arrangement of example 6 or 21-22, wherein the second ring gear is rotationally connectable to the first planet carrier via the first clutch of the crawler unit.

Example 24

The transmission arrangement of any one of examples 1-5, wherein the crawler unit comprises a crawler gear stage, the crawler gear stage comprising a set of crawler gear wheels drivingly connectable between the first planet carrier and the first ring gear via the first clutch of the crawler unit.

Example 25

A powertrain for an electrically propelled vehicle, the powertrain comprising: an electric traction motor, and a transmission arrangement according to any one of the preceding examples, wherein the input shaft of the transmission arrangement is drivingly connected to the electric traction motor.

Example 26

A vehicle comprising the transmission arrangement of any one of examples 1-24, or the powertrain according to example 25.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transmission arrangement for a vehicle, the transmission arrangement comprising:

an input shaft drivingly connectable to an electric traction motor, and an output shaft drivingly connectable to a pair of wheels of the vehicle, a first gear stage comprising a first gear wheel and a second gear wheel drivingly connected to each other, the first gear wheel being rotationally connected to the input shaft, a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are rotationally connectable to the second gear wheel of the first gear stage, and wherein the first planet carrier is rotationally connected to the output shaft, wherein the first ring gear of the first planetary gear set is rotationally connectable to the second gear wheel of the first gear stage by a third clutch of the transmission arrangement, the first ring gear of first planetary gear set being further rotationally connectable to the stationary member via the third clutch, and a crawler unit comprising a plurality of gear members, the crawler unit being drivingly connectable between the first planetary gear set and the output shaft by a first clutch, wherein the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier.

2. The transmission arrangement of claim 1, wherein the first gear stage is a reduction gear stage in which, during operation of the transmission arrangement, the first gear wheel rotates at a higher rotational speed compared to a rotational speed of the second gear wheel.

3. The transmission arrangement of claim 1, wherein the first sun gear of the first planetary gear set is rotationally connectable to the second gear wheel of the first gear stage by a second clutch of the transmission arrangement.

4. The transmission arrangement of claim 1, wherein the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

5. The transmission arrangement of claim 4, wherein the second sun gear is rotationally connected to the first planet carrier.

6. The transmission arrangement of claim 5, wherein the second ring gear is rotationally connectable to the first ring gear via the first clutch of the crawler unit.

7. The transmission arrangement of claim 5, wherein the second planet carrier is rotationally connected to the stationary member of the transmission arrangement.

8. The transmission arrangement of claim 5, wherein the second ring gear is rotationally connected to the first ring gear.

9. The transmission arrangement of claim 5, wherein the second planet carrier is rotationally connectable to the stationary member via the first clutch of the crawler unit.

10. The transmission arrangement of claim 4, wherein the second ring gear is rotationally connected to the first ring gear.

11. The transmission arrangement of claim 4, wherein the second planet carrier is rotationally connected to the stationary member.

12. The transmission arrangement of claim 4, wherein the second sun gear is rotationally connectable to the first planet carrier via the first clutch of the crawler unit.

13. The transmission arrangement of claim 4, wherein the second ring gear is rotationally connected to the first planet carrier.

14. The transmission arrangement of claim 4, wherein the second sun gear is rotationally connectable to the first ring gear via the first clutch of the crawler unit.

15. The transmission arrangement of claim 1, wherein the crawler unit comprises a crawler gear stage, the crawler gear stage comprising a set of crawler gear wheels drivingly connectable between the first planet carrier and the first ring gear via the first clutch of the crawler unit.

16. A powertrain for an electrically propelled vehicle, the powertrain comprising:

a transmission arrangement according to claim 1, wherein the input shaft of the transmission arrangement is drivingly connected to the electric traction motor.

17. A vehicle comprising the transmission arrangement of the powertrain according to claim 16.

* * * * *